(12) United States Patent
Mayer et al.

(10) Patent No.: US 9,387,776 B2
(45) Date of Patent: Jul. 12, 2016

(54) SYSTEM AND METHOD FOR CONTROLLING ADJUSTMENT OF VEHICLE SEATS

(71) Applicant: Lear Corporation, Southfield, MI (US)

(72) Inventors: John M. Mayer, Canton, MI (US); John David Hoeschele, Canton, MI (US); Thomas O'Brien, Troy, MI (US); Jason G. Bauman, Birmingham, MI (US); Charles A. Richlie, Novi, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/711,088

(22) Filed: May 13, 2015

(65) Prior Publication Data

US 2016/0059738 A1    Mar. 3, 2016

Related U.S. Application Data

(60) Provisional application No. 61/992,874, filed on May 13, 2014.

(51) Int. Cl.
*B60N 2/44* (2006.01)
*B60N 2/02* (2006.01)

(52) U.S. Cl.
CPC ....... *B60N 2/0244* (2013.01); *B60N 2002/0272* (2013.01)

(58) Field of Classification Search
CPC .................. B60N 2/0244; B60N 2002/0272
USPC ....................................................... 701/36, 49
See application file for complete search history.

(56) References Cited

U.S. PATENT DOCUMENTS

| | | | | |
|---|---|---|---|---|
| 4,456,861 A * | 6/1984 | Ratzel | ....... | G05B 9/02 318/103 |
| 6,540,295 B1 * | 4/2003 | Saberan | ....... | B60N 2/206 297/283.3 |
| 6,719,245 B2 * | 4/2004 | Wagner | ....... | B60N 2/0224 244/118.5 |
| 7,194,657 B2 * | 3/2007 | Wagner | ....... | B60N 2/0232 714/14 |
| 7,460,005 B2 * | 12/2008 | Nathan | ....... | B60N 2/002 340/5.61 |
| 8,457,846 B2 * | 6/2013 | Fischer | ....... | B60N 2/0224 701/36 |
| 2003/0182043 A1 * | 9/2003 | Christiansen | ...... | G05B 19/0421 701/49 |
| 2004/0031882 A1 * | 2/2004 | Wagner | ....... | B60N 2/0224 244/118.6 |
| 2004/0140783 A1 * | 7/2004 | Fukuhara | ....... | B60N 2/0244 318/467 |
| 2004/0195892 A1 * | 10/2004 | Daniels | ....... | B60N 2/0232 297/378.1 |
| 2005/0052060 A1 * | 3/2005 | Beloch | ....... | B60N 2/0228 297/284.7 |
| 2008/0009989 A1 * | 1/2008 | Kim | ....... | B60N 2/0232 701/36 |
| 2008/0284362 A1 * | 11/2008 | Buhlheller | ....... | B60N 2/0244 318/434 |
| 2013/0341986 A1 * | 12/2013 | Willey | ....... | B60N 2/0252 297/361.1 |

* cited by examiner

*Primary Examiner* — Thomas Tarcza
*Assistant Examiner* — Tyler J Lee
(74) *Attorney, Agent, or Firm* — Brooks Kushman P.C.

(57) ABSTRACT

A system and method for controlling movement of a seat in a vehicle includes first and second seating modules movable between an upright position and a folded position in response to actuation to at least one activation element. A control unit operably connected to the first and second seating modules is configured to receive input from the at least one activation element and generates a control signal to control movement of the first and second seating modules. The control unit deactivates movement of the second seating module until movement of the first seating module when the sensor assembly detects the error condition by the sensor assembly during adjustment of the seating modules.

20 Claims, 5 Drawing Sheets

SYSTEM AND METHOD FOR CONTROLLING ADJUSTMENT OF VEHICLE SEATS

CROSS-REFERENCE TO RELATED APPLICATIONS

This application claims the benefit of U.S. provisional application Ser. No. 61/992,874 filed May 13, 2014, the disclosure(s) of which is hereby incorporated in its entirety by reference herein.

TECHNICAL FIELD

The present invention relates to a system and method for controlling the movement of a power folding seat in a vehicle.

BACKGROUND

A wide variety of vehicle seating arrangements are available for vans, minivans, and sport utility vehicles. Vehicle seating systems may add versatility to vehicles that is derived from the ability to provide different seating configurations. Vehicle seating systems may include seats that are used in a conventional seating configuration or may be converted to provide a full or partial load floor for hauling materials.

Many vehicle seating systems are manual and require a person to release a lever and reposition various portions of the seat to convert the seat to different modes. It is known in the art to use electronically controlled components to provide for assisted positioning of the components of the vehicle seat. Various types of power folding vehicle seating systems and methods are described in the following patents: U.S. Pat. Nos. 6,540,295, 7,460,005 and 7,808,394.

SUMMARY

At least some embodiments of the present invention include a seat control system for a vehicle having one or more rows of seats and a method of controlling movement of one or more vehicle seating modules disposed in the vehicle. The system includes first and second seating modules movable between an upright position and a folded position and at least one activation element configured to receive user input to adjust the seating modules.

A control unit is operably connected to the first and second seating modules and configured to receive input from the at least one activation element to generate a control signal to control movement of the first and second seating modules. A sensor assembly in electrical communication with the control unit is configured to sense an error condition during movement of the first and second seating modules between the upright and folded positions. The control unit deactivates a dual seat mode wherein both the first and second seating modules are adjusted together in favor of a single seat mode in response to detection of the error condition. In the single seat mode, movement of the second seating module ceases until movement of the first seating module is completed.

At least another embodiment of the invention contemplates a method for controlling movement of a seat in a vehicle. First and second seating modules are movable between an upright position and folded position upon actuation of at least one activation element. A control unit is in electrical communication with a sensor assembly to monitor the movement of the first and second seating modules. Movement of the first and second seating modules is controlled based on an evaluation of one or more threshold values by the control unit. In response to detection of an error condition in the one or more threshold values, the controlled movement of the second seating module is overridden to permit further controlled movement of the first seating seat module.

DETAILED DESCRIPTION

Figure 1:
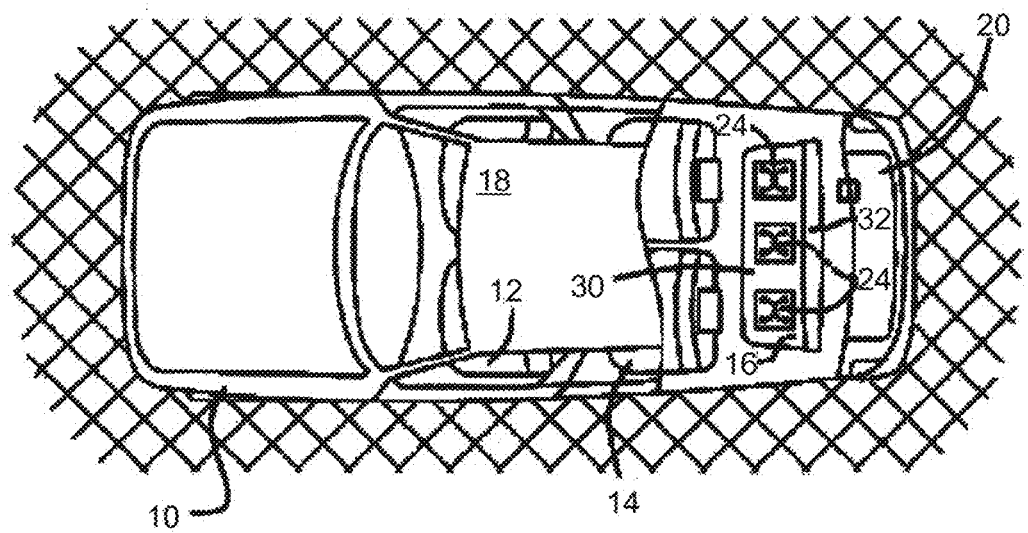
FIG. 1 is a partially fragmented top plan view of a vehicle having three rows of seats in accordance with embodiments of the present invention.

As required, detailed embodiments of the present invention are disclosed herein; however, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

With references to the Figures, a more detailed description of embodiments of a system and method for controlling the adjustment of a vehicle seat will be described. For ease of illustration and to facilitate understanding, throughout the following description similar reference numerals have been used to denote similar elements, parts, items or features in the drawings, where applicable.

Referring to FIG. 1, a vehicle 10 such as a minivan, sport utility vehicle, or other vehicle having a seat system that may be folded into a cargo-carrying configuration is illustrated. In one non-limiting embodiment, seat system of the vehicle 10 shown in FIG. 1 with a first row of seats 12, a second row of seats 14 and a third row of seats 16. The roof 18 and hatchback 20 of the vehicle 10 is partially cut-away in FIG. 1 to reveal the third row of seats 16. For exemplary purposes, the third row of seats 16 include one or more seat bottoms, individual seats bottoms shown by reference number 24 and collectively by reference number 30 and one or more seat backs 32 connected thereto. The seat back 32 of the third row seat 16 is shown in its generally upright or seating position.

Figure 2:
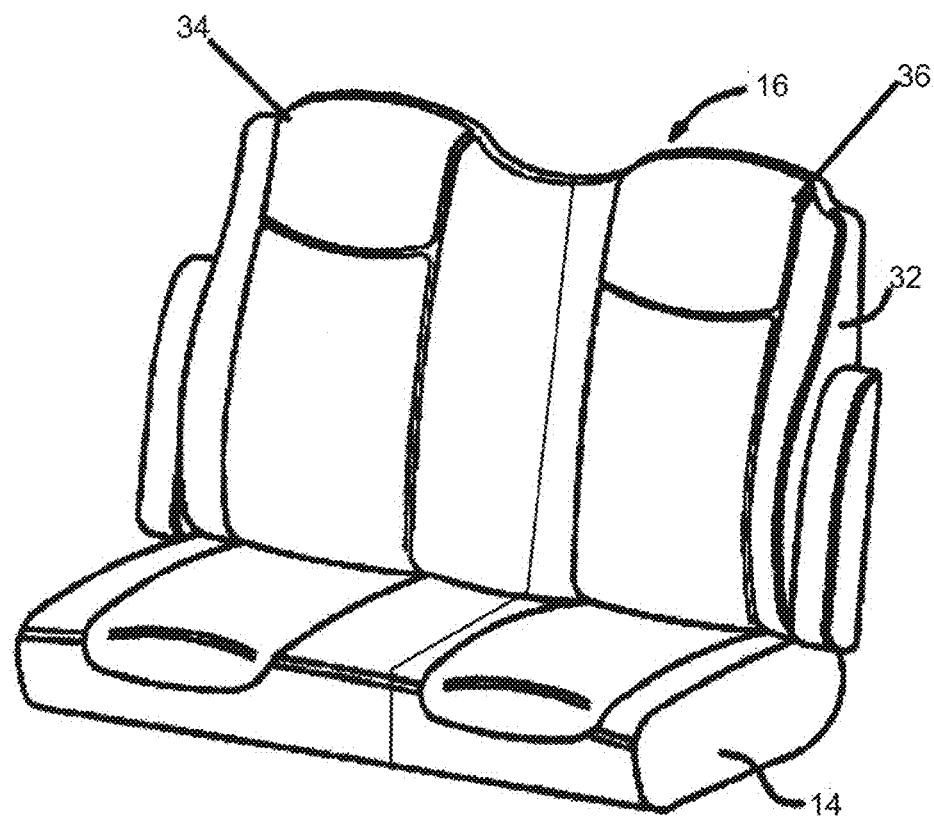
FIG. 2 is a perspective view of a row of seats having a 60/40 split seating arrangement for the vehicle seating system in accordance with embodiments of the present invention.

Referring to FIG. 2, seat system includes a row of seats 16 is shown to include a base 30 and a back 32. The base and back may be made of one or more components including a foam bun that forms a supporting seat body that is covered by fabric, vinyl, leather or the like, as is well known in the art.

Seating rows 14, 16 may each be assembled as a single unit. Alternatively, as shown in FIG. 2, seat system may include a row of seats includes a first seating portion or module 34 and a corresponding second seating portion or module 36. Seating modules 34, 36 may be divided to allow the first and second seating modules 34, 36 to be adjusted from an upright or seated position to a folded or stowed position to create cargo area in the vehicle.

Figure 3:
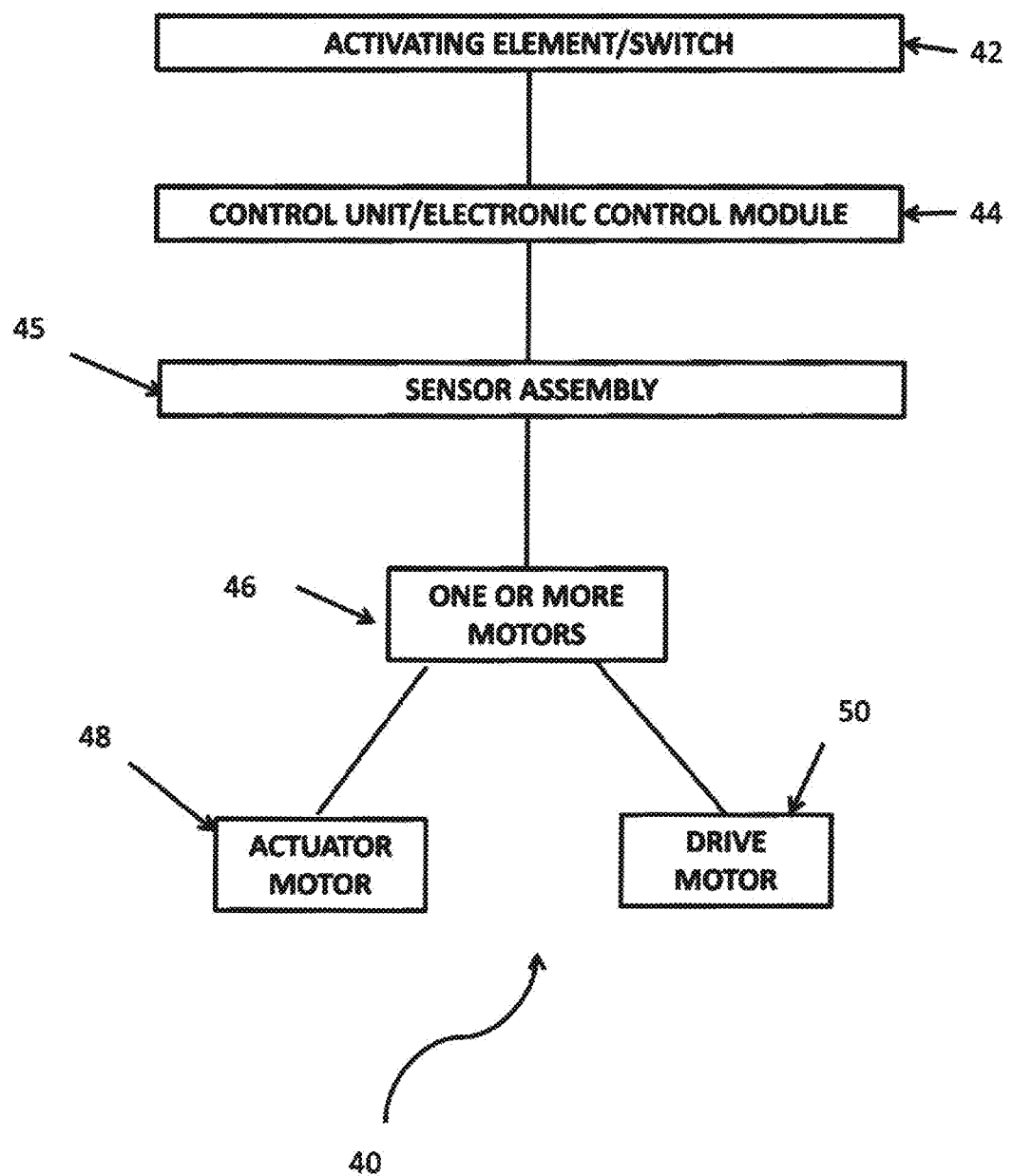
FIG. 3 is a schematic representation of the seating control system in accordance with embodiments of the present invention.

Referring to FIG. 3, a seat control system 40 is shown diagrammatically. One or more activation elements or control switches 42 may be provided on the vehicle in a variety of locations, such as the vehicle instrument panel, console or near a door, among a number of locations in the vehicle. Activation elements 42 are configured to receive user input to allow a user to adjust the position of the first and second seating modules between an upright position and a folded position within the vehicle. The control switch may also be provided on a key fob, if desired.

A control unit or electronic control module 44 is operably connected to the first and second seating modules in the vehicle. One or more sensors 45 in electrical communication with the control module 44 monitor operation of the one or more motors 46. In at least one embodiment of the invention, the first and second seating modules each include a seat bottom and a seat back being rotatable relative to the seat bottom about a recliner mechanism. The at least one motor is operatively connected to the seat back and in electrical communication with the control unit to rotate the seat back relative to the seat bottom.

In one of the embodiments of the invention, the one or more motors 46 including actuator motor 48 and drive motor 50. Motors 48, 50 may be electric or, alternatively, could be a linear motor or cylinder, depending upon the design of the seat 16. A seat actuation element may be configured to interact with elements of the seat 16 so as to facilitate seat folding. An exemplary actuating system for a vehicle seat is described and claimed in Applicant's issued U.S. Pat. No. 7,320,501, among others, which is hereby incorporated by reference in its entirety.

The seat 16 and seat actuation element may include any number of features, devices, linkages, controllers, and other operable elements required to facilitate seat folding operations, such as those associated with U.S. Pat. No. 7,547,070, the disclosure of which is hereby incorporated by reference in its entirety. The present invention, however, is not intended to be limited to vehicles and fully contemplates its application to any environment where it may be desirable to facilitate seat folding, such as but not limited watercraft, aircraft, non-vehicle seating, and the like. As such, the seat 16 and seat actuation element may include any number of other elements and capabilities in order to facilitate seat folding operations in such other environments.

The seat actuation element may be an electrically operable element in that may be configured to electrically execute or instigate seat folding in response to signals received from a key fob and/or a seat switch 42. For example, the seat actuation element may include a controller or other element (not shown) configured to receive signals from the key fob, switch 42 or other aforementioned signal sources to electrically facilitate folding the seat 16 as a function thereof.

The seat 16 may include springs, hydraulics, or other features controlled, instructed, or otherwise manipulated with electrical signals. The seat actuation element may communicate with such electrically controllably elements so as to facilitate seat folding operations. The folding may occur from a use or upright position to a non-use or folded position, from the non-use or folded position to the use or upright position, and/or from or to any number of other positions, including positions dependent on the configurations and capabilities of the seat 16 and seat actuation element.

The activation element or switch 42 may be positioned locally on the vehicle in an area proximate to the seat 16, such as but not limited to a position within the vehicle from which the user thereof is able to view the seat 16 and elements or persons thereon or in close proximity thereto. Optionally, the seat switch may be positioned at other areas of the vehicle 10. The switch 42 may be actuated with a depressive force or other user triggerable actuation such that the user must be within reach or otherwise in contact with the switch 22 in order to electronically control seat folding.

Activation element 42 may include buttons, touch-screens, or other user actuated features (not shown). These features may be associated with seat folding controls associated with the seat 16 and seat actuation element such that a user may control seat folding operations, i.e., to control folding the seat up and down. Optionally, the vehicle may include multiple switches to facilitate seat folding from different areas of the vehicle 10.

In one of the embodiments of the invention, a feedback apparatus may be provided as part of the seat control system to provide an operator perceptible output that can warn the operator that the seat folding operation was not completed. The feedback apparatus may provide an indication that a foreign object is on the seat or another reason for the failure of the seat to complete its seat folding operation. For example, the feedback apparatus may provide information to advise the operator that the seat folding operation was interrupted.

Figure 4:
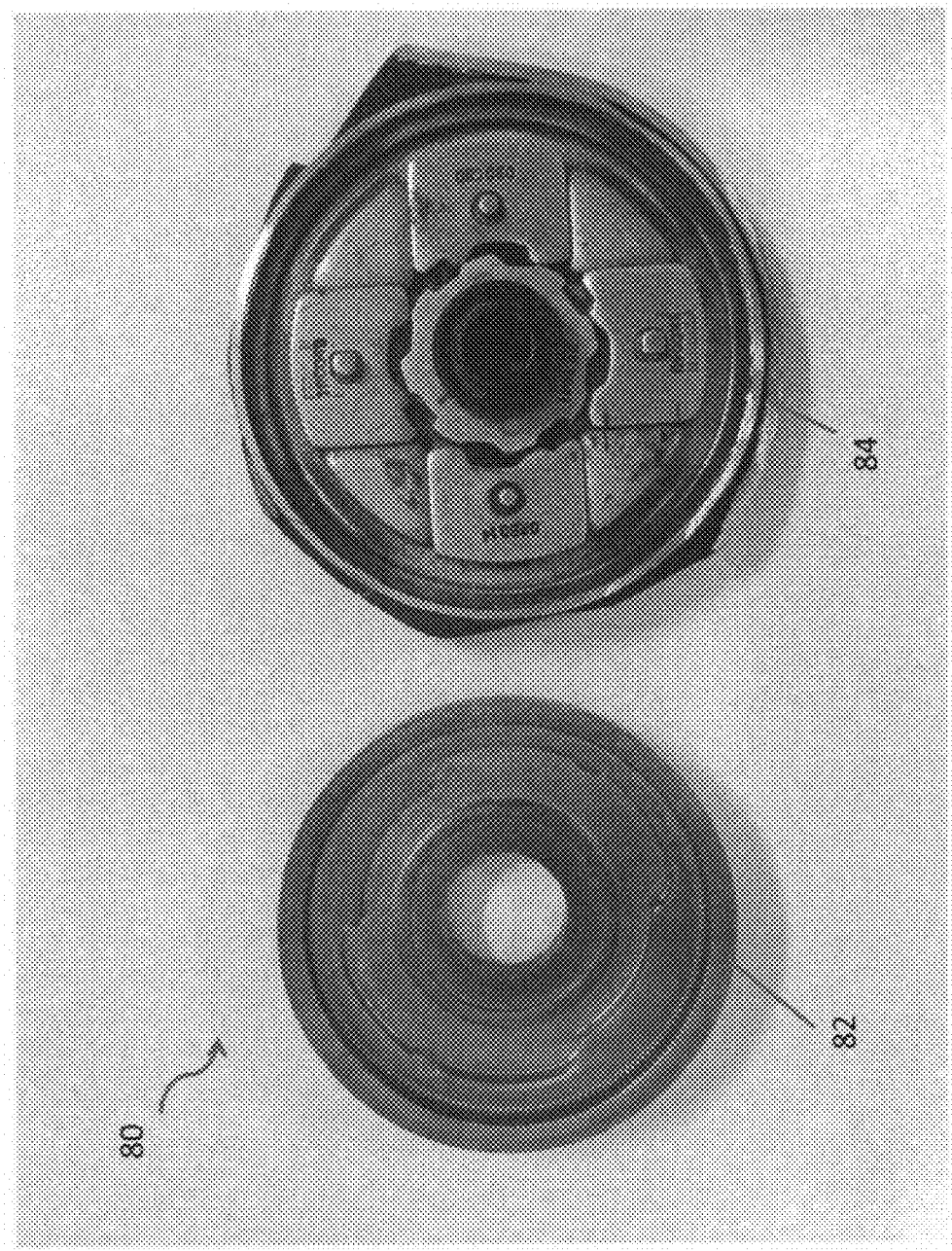
FIG. 4 is a side plan view of a recliner mechanism for use with embodiments of the present invention.

Referring now to FIG. 4, an exemplary recliner mechanism is shown for use with the vehicle seat of the embodiments of a present invention. In at least one of the embodiments of this invention, one or more recliner mechanisms 80 are mechanically interconnected with a seat bottom and a seat back. An exemplary recliner mechanism interconnected with the vehicle seat are described and claimed in Applicant's issued U.S. Pat. No. 7,703,852, among others, which is hereby incorporated by reference in its entirety. The recliner mechanism 80 includes a guide plate 82 adapted to be secured to one of the seat base or seat back and a pivotal plate 84 adapted to be secured to the other of the seat base or seat back. Guide plate 82 is shown with gear teeth dispersed around the circumference of the plate. Pivotal plate 84 includes a plurality of engaging members, each having a plurality of gear teeth dispersed about a portion of the periphery, to engage the gear teeth on the guide plate.

Figure 5:
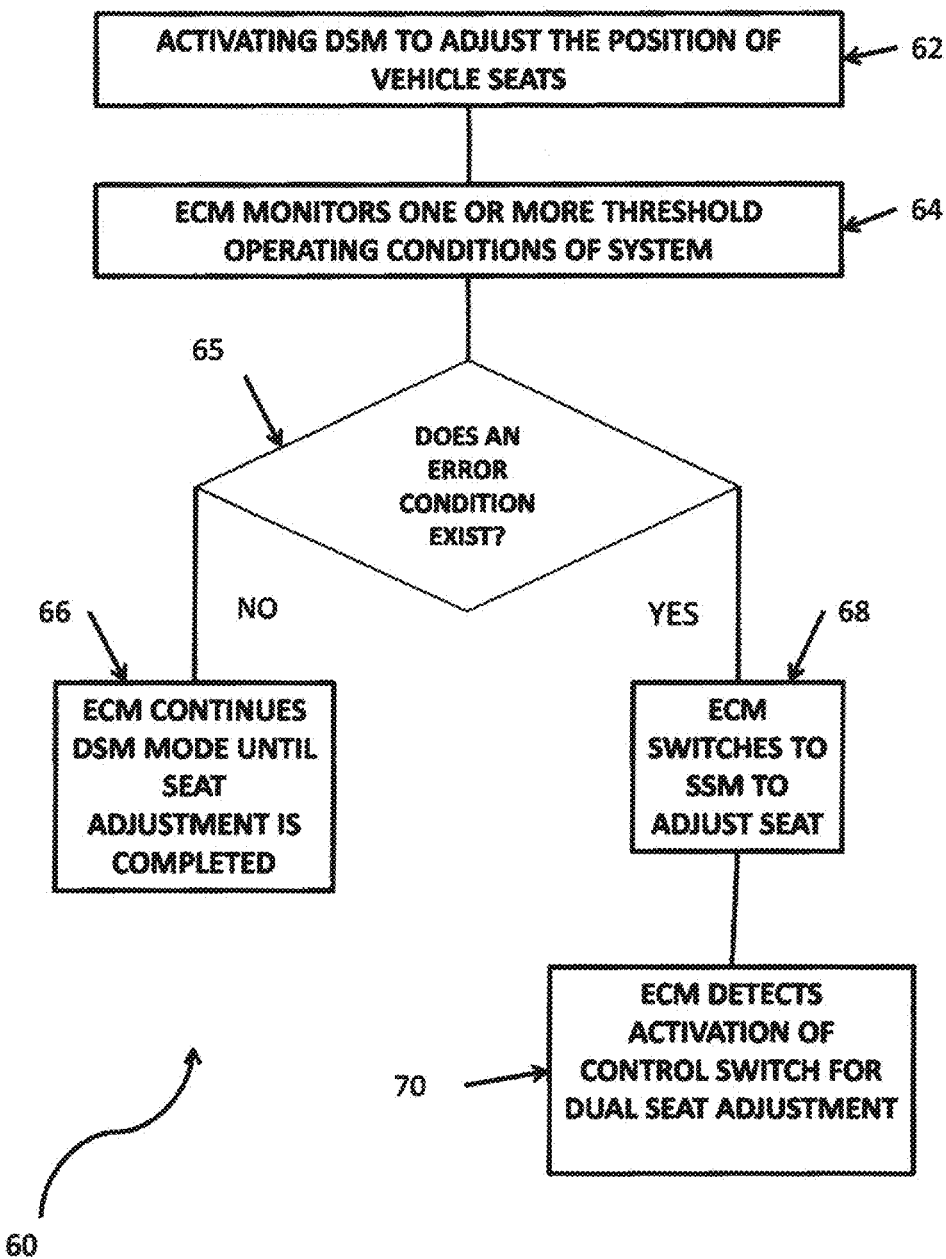
FIG. 5 is a flowchart diagram of the seat control system and method for controlling the adjustment of the seat in accordance with embodiments of the present invention.

Referring now to FIG. 5, a method for controlling the adjustment of power folding vehicle seats is described in greater detail. FIG. 5 illustrates a flowchart 60 of a method of seat folding in accordance with one of the non-limiting embodiments of the present invention. The method is described for exemplary purposes only with respect to folding the vehicle seat shown in FIG. 1. As noted above, the present invention is not so limit and fully contemplates its application with any number of folding seats, and not just vehicle seats.

The seat control system may include one or more operation modes. For example, in a dual seat mode (DSM), activation of an activation element instructs the electronic control module to transmit a control signal to activate the at least one motor operably connected to each of the first and second seating modules to move the modules between the folded position and upright position. It is contemplated that in dual seat mode, the first and second seating modules can move individually or at the same time. In another embodiment of the invention, the seat control system includes a single seat mode (SSM), wherein an operator can individually select to fold or unfold one of the first and second seating modules.

Block 62 relates to determining a request for seat movement. The request may be received from the at least one actuating element. It may indicate any number of seat folding operations and/or specify particular seats for folding, such as if the vehicle includes multiple seats. The request may be processed by the seat system or with some other element within the vehicle, such as but not limited to a vehicle system controller. An operator actuates the activation element such that the control unit generates a control signal to move the seating modules using the dual seat mode function of the seat control system at step 62 to move the first and second seating modules from at least one upright or seating position to at least one folded or stored position.

Block 64 relates to the monitoring of one or more conditions of the seat system during the folding operation. At step 64, the electronic control module monitors one or more threshold operating conditions, which may include a number of factors, including, but not limited to, an increase or decrease in the module supply voltage of the system.

Block 65 relates to the evaluation of the conditions of the seat system by the electronic control module. In one embodiment of the invention, seat system monitors adjustment of at least one seat to determine whether the seats reach a fully folded or fully upright position. If the electronic control module does not detect any errors in the threshold conditions in the seat system, the electronic control module will continue to operate in dual seat adjustment mode and continue to move both the first and second seating modules to either a fully folded or fully upright position as referenced in block 66.

Block 68 relates to the identification of an error condition by the electronic control module in block 65 and shift from the dual seat mode to a single seat adjustment mode. An exemplary error condition may be a voltage drop below a threshold limit. It is contemplated in one embodiment of the invention that the threshold limit to be monitored by the system may be about 9.5 volts. Switching the seat control system from dual seat mode to single seat mode will send the available power to be provided to one of the first or second seating modules to provide the best opportunity for the seat to reach the fully folded or fully upright position.

In one embodiment of the invention, the first seating module is given priority over the second seating module such that, in the case of an error condition, the control unit will deactivate the dual seat mode and activate a single seat mode. In single seat mode, the control unit or electronic control module will continue to supply power to the first seating module motors and override activation of the motors for the second seating module. It is understood that the second seating module may be given priority over the first seating module in another embodiment of this invention.

Figure 6:
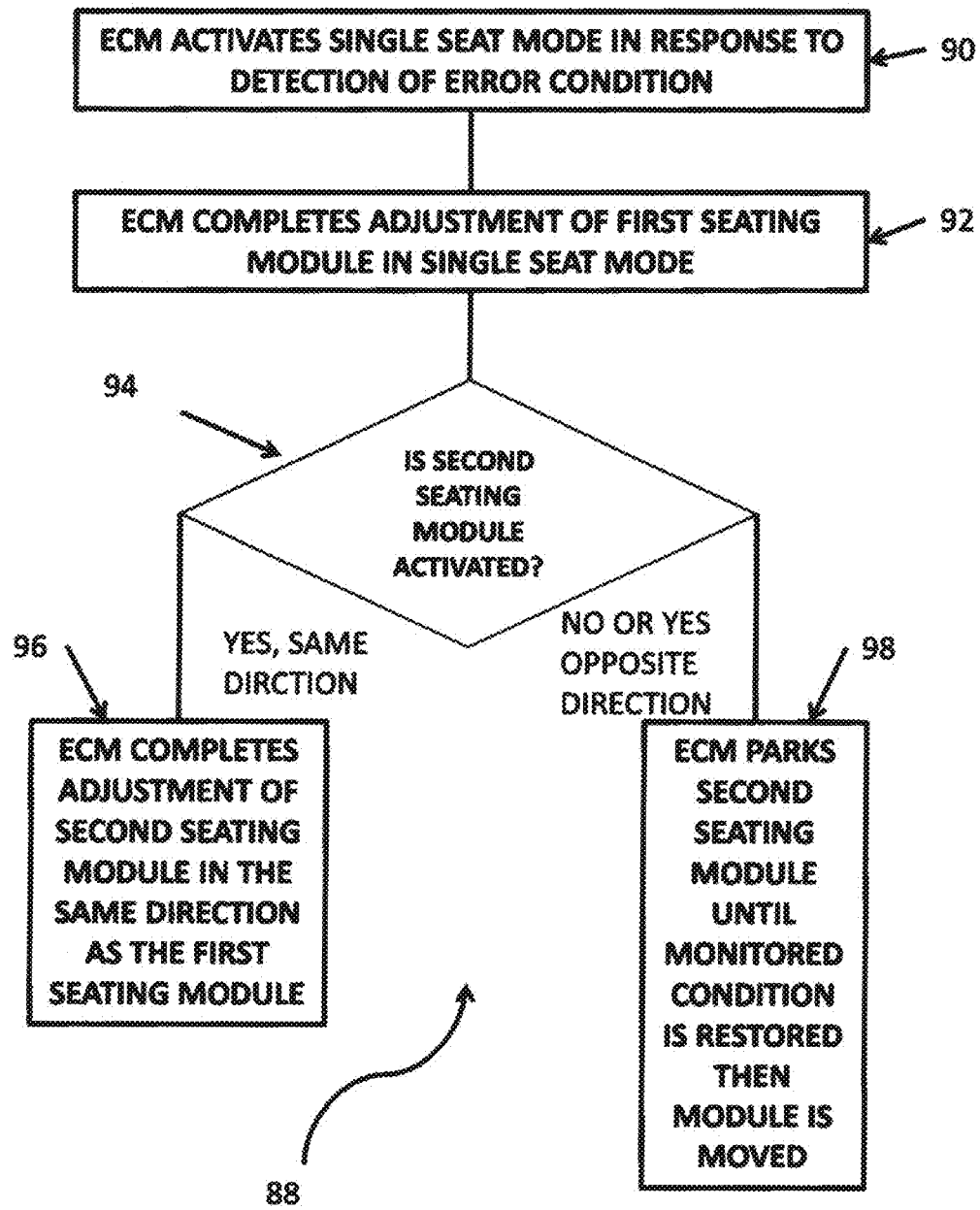
FIG. 6 is a flowchart diagram of the single seat mode of the seat control system and method for controlling the adjustment of the seat in accordance with embodiments of the present invention.

Referring now to FIG. 6, a simplified flowchart of the embodiment of the system and method for adjustment of a vehicle seat as disclosed herein further illustrates operation of the single seat mode, generally referenced by numeral 88. As discussed above, should the electronic control module detect an error condition wherein a condition detected is less than or equal to or, alternatively, greater than or equal to, a predetermined threshold, the electronic control module may transmit a "stop" signal to the system to place the system in single seat mode as shown in block 90.

Block 92 illustrates one embodiment of the present invention, wherein first and second seating modules are a 60/40 split seating arrangement wherein the first seating module is the 60 portion of the arrangement. When the single seat mode is activated while both seating modules have been operating, the electronic control module prioritizes operation of the seating modules such that the first seating module continues to operate while operation of the second seating module ceases until adjustment of the first seating module is complete. In another embodiment of the invention, any activation element or switch operations for the second seating module are not acted upon until completion of adjustment of the first seating module. In yet another embodiment of the invention, it is contemplated that operation of the second seating module will not begin until adjustment of the first seating module is completed and the voltage of the seating system exceeds the threshold voltage, which may be a higher voltage than the voltage below which the seating system enters single-seat mode, in order to provide hysteresis and prevent the system's "hunting" about the threshold voltage.

Block 94 relates to completion of the adjustment of the first seating module by the electronic control module. If the activation element for the second seating module is actuated to move the second seat in the same direction as the first seating module as shown in block 96, the electronic control module will resume adjustment of the second seating module until the adjustment is completed and deactivated. At block 98, if the activation element is not actuated or actuated such that the second seating module would move opposite the direction of first seating module, the electronic control module parks the second seating module and does not process the signal from the activation element until the seating system monitored condition, such as system voltage threshold, is exceeded. The voltage threshold above which the system returns to normal control capability of the seats may be above the voltage threshold below which the system enters single seat mode, in order to provide hysteresis.

Referring back to FIG. 5, in another embodiment of the invention, the electronic control module monitors the positioning of the first seating module until a desired position is obtained at the end of a seat adjustment operation. Block 70 relates to this adjustment process. If the control switch for the second seating module remains activated after the single seat mode positions the first seating module, the electronic control module returns to dual seat mode and transmits power to the second seating module until the requested seating position is completed and the second seating module is parked.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for controlling movement of a seat in a vehicle, the system comprising:
    first and second seating modules each movable between an upright position and a folded position;
    at least one activation element configured to receive user input;
    a control unit operably connected to the first and second seating modules configured to receive input from the at least one activation element and control movement of the first and second seating modules; and
    a sensor assembly in electrical communication with the control unit configured to sense an error condition during movement of at least one of the first and second seating modules between the upright and folded positions, wherein the control unit deactivates movement of the second seating module until movement of the first seating module is completed when the sensor assembly senses the error condition during adjustment of at least one seating module.

2. The system of claim 1 wherein the first and second seating modules each further comprise a seat bottom, a seat back being rotatable relative to the seat bottom and at least one motor operatively connected to the seat back and in electrical communication with the control unit to rotate the seat back relative to the seat bottom.

3. The system of claim 1 wherein the control unit includes a dual seat adjustment mode that allows movement of each of the first and second seating modules between the upright and folding positions.

4. The system of claim 3 wherein the control unit includes a single seat adjustment mode that allows movement of only the first seating module between the upright and folding positions when the error condition is detected by the control unit.

5. The system of claim 4 wherein the single seat adjustment mode of the control unit allows the second seat module to move between the upright and folding positions when movement of the first seating module is completed and the second seating module is adjusted in the same direction as the first seating module.

6. The system of claim 4 wherein the single seat adjustment mode of the control unit allows the second seat module to move between the upright and folding positions when movement of the first seating module is completed and the error condition is no longer detected by the control unit.

7. The system of claim 1 wherein the sensor assembly monitors the first and second seating modules for a decrease in a threshold value for supply voltage to generate an error condition signal for use by the control unit.

8. A method for controlling movement of a seat in a vehicle, the method comprising:
providing first and second seating modules each movable between an upright position and folded position upon actuation of at least one activation element;
providing a control unit in electrical communication with a sensor assembly to monitor the movement of the first and second seating modules;
controlling movement of the first and second seating modules based on an evaluation of one or more threshold values by the control unit; and
overriding, in response to detection of an error condition in the one or more threshold values, controlled movement of the second seating module to permit further controlled movement of the first seating seat module.

9. The method of claim 8 further comprising the step of providing a dual seat adjustment mode that permits the control unit to adjust the movement of each of the first and second seating modules between the upright and folding positions.

10. The method of claim 8 further comprising the step of providing a single seat adjustment mode that permits the control unit to adjust the movement of the first seating module and ceases movement of the second seating module between the upright and folding positions in response to detection of the error condition.

11. The method of claim 10 wherein the step of providing a single seat adjustment mode further comprises adjusting the second seat module between the upright and folding positions when movement of the first seating module is complete and the second seating module is adjusted in the same direction as the first seating module.

12. The method of claim 10 wherein the step of providing a single seat adjustment mode further comprises adjusting the second seat module between the upright and folding positions when movement of the first seating module is completed and the error condition is no longer detected by the control unit when the second seating module is adjusted in the opposite direction as the first seating module.

13. The method of claim 12 wherein inputs from at least one actuating element for movement of the second seating module are not acted upon by the control unit until operation commands for movement of the first seating module are completed.

14. The method of claim 8 further comprising determining an override event according to the detection of a threshold value of a supply voltage to the first and second seating modules.

15. A method for controlling movement of a seat in a vehicle, the method comprising:
providing first and second seating modules movable between an upright position and folded position upon actuation of at least one activation element;
providing a control unit in electrical communication with a sensor assembly to monitor the movement of the first and second seating modules;
adjusting the movement of the first and second seating modules using a dual seat adjustment mode that permits the control unit to adjust the seating modules together between the upright and folding positions;
controlling movement of the first and second seating modules based on an evaluation of one or more threshold values by the control unit; and
overriding, in response to detection of an error condition in the one or more threshold values, controlled movement of the second seating module to permit further controlled movement of the first seating seat module.

16. The method of claim 15 further comprising the step of providing a single seat adjustment mode that permits the control unit to adjust the movement of the first seating module and cease movement of the second seating module between the upright and folding positions in response to detection of the error condition.

17. The method of claim 15 wherein the step of providing a single seat adjustment mode further comprises adjusting the second seating module between the upright and folding positions when movement of the first seating module is complete and the second seating module is adjusted in the same direction as the first seating module.

18. The method of claim 15 wherein the step of providing a single seat adjustment mode further comprises adjusting the second seating module between the upright and folding positions when movement of the first seating module is completed and the error condition is no longer detected by the control unit when the second seating module is adjusted in the opposite direction as the first seating module.

19. The method of claim 18 wherein inputs from at least one actuating element for movement of the second seating module are not acted upon by the control unit until operation commands for movement of the first seating module are completed.

20. The method of claim 15 further comprising determining an override event according to the detection of a threshold value of a supply voltage to the first and second seating modules.

* * * * *